United States Patent Office 3,264,125
Patented August 2, 1966

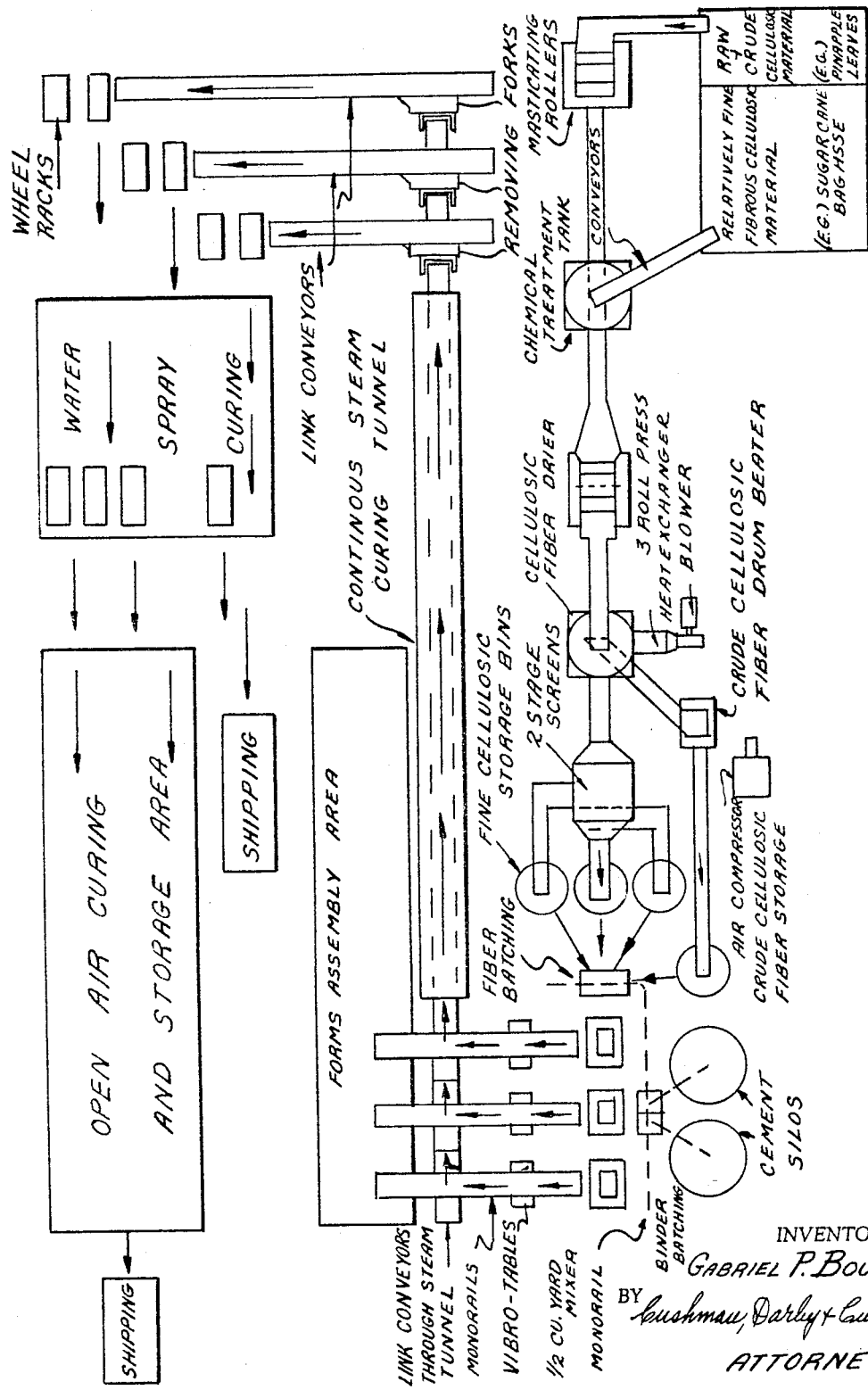

3,264,125
MANUFACTURE OF LIGHTWEIGHT CONCRETE PRODUCTS
Gabriel P. Bourlin, Honolulu, Hawaii; Ludmilla I. Bourlin, L. L. Gowans, and Robert E. Brown, executors of Gabriel P. Bourlin, deceased, assignors to Versicrete Industries, Honolulu, Hawaii, a limited partnership
Filed Dec. 4, 1962, Ser. No. 242,124
15 Claims. (Cl. 106—76)

The present invention relates to an improved process for the production of lightweight concrete products, and to the new products obtained thereby.

The island State of Hawaii is distant from any adequate and cheap source of construction and building materials. These materials have to be imported, stored and handled many times before actually reaching the prospective public, all of which tends to increase their final cost. Due to such high handling costs, lumber and other lightweight materials of construction are obviously very desirable.

The lumber industry on the largest island of Hawaii is in its infancy and it will take many years for the trees planted there to achieve large enough size for commercial milling. Therefore, there is little possibility that the locally grown lumber will eventually supply all Hawaiian building material requirements, as its replenishment necessarily entails a lengthy growing process.

Cement products and lightweight masonry products, hollow tiles and such, although locally manufactured, depend largely on the imported lightweight aggregates from other Hawaiian islands and from the United States mainland, which increases their cost. Also these materials, due to their weight, are made in relatively small sizes, resulting in high labor erection costs, in terms of masons, helpers, etc., per square foot of completed construction area.

Accordingly, it would be very desirable to manufacture inexpensive, lightweight building products in the State of Hawaii from readily available local raw materials, such as cement, bagasse (the residue from sugar cane after the juice is removed) and pineapple leaf fibers in combination with a few chemicals either purchased locally, or for economic reasons, imported direct from the west coast. Such a process would make it possible to produce cheap, durable, decorative and easily erectable masonry material building boards of considerable size, say about 15–32 square feet per unit.

This would result in economy to the public, not only in the actual material cost, but also in construction labor costs, as well as in future maintenance, in the instance where the resultant material is weather, rot and termite-proof, fire resistant and like.

It has been a principal object of prior inventions of this type to satisfy the foregoing desires and provide a process for manufacturing lightweight building products using locally available chemicals, concrete and fibrous materials.

The above objects had hopefully been accomplished in prior art procedures by the utilization of specially prepared and treated cellulosic fibrous materials as aggregates in lightweight concrete formulations for the manufacture of various types of building and structural materials, such as: slabs, panels, wall boards, hollow blocks, floor and roof tiles, beams, columns, posts, conduits and pipes; both reinforced and not reinforced by steel, depending on the use and purpose for which the manufactured products are fabricated.

Generally, cellulosic and vegetable fiber materials are composed of: celluloses (forming the true and stable core of the fibers), carbohydrates (in the form of hemicelluloses and nonfibrous cellulosic materials, sugars and starches), lignins (organic binding agents), proteins (nitrogenous organic compounds), and resins, gums, waxes and fats. Of these compounds in cellulosic and vegetable fiber materials, it is desired to utilize only the true and stable cellulosic fibrous materials, as the remaining noncellulosic and soluble organic materials add nothing beneficial to the cementing properties of a concrete mass, but do in fact, in certain cases and in certain concentrations exert very detrimental effects, not only on the setting and hardening properties of the generally used binders, but also result in considerable losses both in the technical and in the structural properties and strength of the manufactured products.

The prior art has employed several procedures in attempting to reduce the detrimental effects of the noncellulosic and soluble organic materials contained in the commonly used cellulosic and vegetable fiber materials, prior to mixing them with cementitious binders (Portland cements, or other utilizable cement-like binders) and these are generally outlined as follows:

(a) Saturation of the fibers in various metallic solutions of chlorides, sulphates and/or nitrates, with or without addition of lime.

(b) Saturation of the fibers in strong lime solutions stabilized by metallic polyvalent salts.

(c) Saturation of the fibers in lime slurry and stabilizing the lime by addition of pozzalan (pozzolan or pozzolana, a volcanic ash used as an hydraulic cement), and one or several of the water soluble polyvalent metallic salts.

There are also several other processes where the aim is to film or coat the vegetable fibers with various soluble and/or nonsoluble chemical solutions or compounds, which react with those noncellulosic, soluble organic compounds contained in the vegetable fiber materials, to such an extent that their detrimental effects are rendered less detrimental, to a degree, which permits the setting and hardening of the commonly used cementitious binders to take place supposedly without deleterious effects.

It has unfortunately been discovered that all these prior art procedures possess a major, and very serious defect. That is, it has been found in practice that the fibrous materials, after having been filmed or saturated by one or another of the above-mentioned methods to reduce their detrimental components, merely become light weight filler materials when mixed in a cementitious binder. Thus, and according to these prior art processes, the cementitious binder materials set or hardens around these entrapped or enveloped fibers without gaining any strength or benefit from the fibers used. Moreover, the binder does not become any stronger in itself, since these entrapped or enveloped fibers, with which there is little if any bond in the resulting concrete mass, represent weakening voids or pits, due to the considerably lesser compressive strength of these entrapped vegetable fibers to that of the rest of the enveloping concrete. The entrapped fibers, because they remain in their relatively native state, are also subject to destruction by moisture fire, termites, aging, rotting, thermal shock and chemical degradation, thus introducing weakened areas in the concrete mass and hastening its general deterioration.

In view of these disadvantages, few if any of the prior art developments of this type have achieved any degree of commercial acceptability since they have proved to be unstable and generally not suitable for building applications.

Accordingly, it is the purpose and object of the present invention to develop a workable and commercially useful process of utilizing cellulosic and vegetable fibers, from any source whatever, as aggregate in lightweight concrete structures in such a way that they become a true and integral part of the resulting concrete, thereby imparting not only beneficial lightweight properties, but also considerable tensile strength properties available from the completely bonded true and stable cellulosic fibers, without any appreciable loss to the compressive strength of the concrete mass thus fabricated.

It is another object of this invention to provide a process involving the complete chemical and thermal pre-treatment of suitable cellulosic and vegetable fiber materials for the purpose of dissolving, removing, inverting and otherwise neutralizing all organic components contained in the vegetable fiber materials, which are known to be detrimental to strength and setting properties of the generally used cementitious binders, and leaving only the true and stable cellulosic fibers for use as aggregates in a specially formulated cement bound concrete.

It is still another object to provide an improved lightweight concrete structure that will be useful in any areas where strong, durable and economical materials of construction are desired.

Other and further objects of this invention will become apparent to those skilled in the art when reference is had to the following detailed description.

To accomplish these objectives, the present invention employs the chemical neutralization of cellulosic fibers from any available source, and the mixing of the neutralized fibers with a specially prepared concrete composed of cement and other chemicals. The neutralized cellulosic fibers in this manner become an integral aggregate and component in the resulting mass.

More particularly, and according to the present invention, there has been discovered a process of stripping, by chemical and heat treatment, all the organic, unstable and soluble components from any desired vegetable fiber material, leaving only the true and stable cellulosic fibers, the cells of which are open, unobstructed and unclogged by soluble organic compounds and unfilmed by fats, waxes, resins and/or gums. In this neutralized and treated condition, the cellulosic fibers, after being dried to a relatively low moisture content, are then mixed in a fluid formulation of a specially prepared cementitious binder in which certain chemicals are dissolved.

Due to its flexibility and broad scope, the present invention envisions the utilization of crude, partially refined and/or relatively finished fibers, all requiring relatively lesser degrees of treatment herein, respectively. Moreover, and according to the present invention, these cellulosic and vegetable fibrous materials may be obtained from any desired source, including island palms, northern U.S. and Canadian firs, and northeastern and southern pines and hardwood, as well as from various agricultural plant products.

In the case of an agricultural plant product such as sugarcane bagasse fibers, which are relatively partially refined, the neutralization requirements are somewhat relaxed and center on the removal of waxes and sugars. The waxes are removed either by a solvent extraction process, with their subsequent recovery as a by-product, or a caustic saponification process without the use of solvents, in which case no wax recovery is achieved.

When a raw material, such as pineapple leaves are used herein, they must be first masticated and digested in chemical solutions where all the organic compounds are dissolved and removed, leaving only the true and stable cellulosic fibers.

On the other hand, if pure natural or synthetic cellulosic fibers are obtained for use herein, they will quite naturally require relatively little, if any, treatment to become neutralized and may readily be used in the present invention. Obviously, the only disadvantage to using such pure cellulosics will be an economic one, since they will normally be costly finished materials. It is, therefore, more desirable to use reasonably inexpensive agricultural and industrial waste and by-product materials in the present lightwight concrete.

The resulting neutralized cellulosic fibers, when dried to about 5 to 20% moisture and preferably to about 10 to 15% moisture, are then mixed with cement pastes of various densities in which several chemicals have been dissolved as additives. The dried cellulosic fibers readily absorb the dissolved chemicals from the cement paste. These chemicals, upon setting, crystallize within the fibers, making them waterproof, rot-proof and fire resistant. The impregnated fibers, upon final setting, bond completely with the cement binder, thus becoming not just a lightweight filler material, but an integral part of the concrete mass.

The treated and dried cellulosic fibers readily absorb the fluid chemical and cementitious formulation deep into their open and unobstructed fiber cells. The materials absorbed in the cells crystallize and set (harden) uniformly with the rest of the concrete mass, becoming an integral part of the resulting mass, which is in fact completely impregnated by, and therefore composed of, the same and identical cementitious formulation.

Employing the above-mentioned process which is described hereinafter in greater detail, small and large lightweight, cement bound samples were made according to the process herein and these samples possessed excellent appearance and dimensional stability under wet, dry, cold and hot conditions, with high compressive and tensile strengths and high durability and weatherability ratings, as well as fire, insect and rot-proof characteristics. Samples thereof were immersed in several saline, sulphate, and acid solutions of varying concentrations with little or no detrimental effects noticed.

Samples were then burned in open fire for several hours and hosed down by cold water immediately after, while still hot, without any disintegrating, detrimental, or spalling effects. Upon subsequent atmospheric cooling and drying, no appreciable loss in either the tensile or compressive strength was registered. Samples were later cut for internal examination to determine the extent to which the cellulosic fibers were damaged by fire. No such effects were observed.

Samples were buried in a decaying mass of wet vegetable materials for a period of six months and upon removal, examined externally and internally for rotting or decaying of the cellulosic fibers. No such effects were found.

Samples were exposed to atmospheric conditions of rain and sun with periodic immersion, to the saturation point, in sea water, in repeating cycles for over one year with no apparent ill effects. Effects such as distortion, shrinkage, expansion, cracking, deterioration, compressive weakening and other weathering signs were not found to be present.

Although the following types of cellulosic and vegetable fibers were used in the above-mentioned tests, the process itself is adaptable for the utilization of any other vegetable and/or industrial waste fibers, from which true and stable cellulosic fiber materials can be separated. Examples of sources of fibers that have been found suitable for use herein are: sugar cane bagasse (fresh from sugar mills); cocoanut tree branches (freshly cut) and cocoanut palm leaves; pineapple plants and leaves (freshly cut from the fields); bamboo shavings (from freshly cut bamboos) and bamboo plants; hemp fibers (derived from old and used ropes); and mixtures of various types of wood shavings (as collected from a normal run of a lumber yard saw mill); and banana plant fibers, including fibers from the trunk and branches of banana plants.

As the present process involves chemical and thermal pretreatment of such vegetable fiber materials, as described above, prior to utilizing them in the cementitious mixtures, it has been surprising to note that no apparent difference in the strength, setting or hardening properties, durability and stability of the manufactured products has been observed whether freshly cut and green, or seasoned, fermented and partially inverted vegetable fiber sources were used. One fact that had been noticed, however, is that when partially inverted cellulosic fibers were used, less chemicals and time, as well as lower temperatures are required in the neutralizing and pretreatment process herein, than are required when treating freshly cut and green vegetable fiber sources.

The attached flow sheet, which is self-explanatory, illustrates the sequence and the manufacturing stages of the invented process. Although the flow sheet is designated for the utilization of sugar cane bagasse and pineapple leaf fibers, because these materials are readily available in the State of Hawaii, it is to be understood that the process is not limited to the utilization of only these fibers, and that this flow sheet is only submitted for illustrative purposes.

THE NEUTRALIZATION AND PRETREATMENT PROCESS

The cellulosic or vegetable fibers selected for use in the manufacture of lightweight concrete products herein are first cut, shredded, masticated or otherwise reduced to the required size or form, depending on the purpose and the manufacture of what products they are intended. After being properly reduced to the required size and form, the fibers are conveyed to and into a chemical treatment tank provided with mechanical agitators. Into this tank is added a neutralizing water solution containing dissolved sodium hydroxide in an amount equal to about 1 to 3 lbs. of sodium hydroxide per each 50 gallons of water used.

The solution strength employed differentiates with the type, greenness and wax, fat, gum and resin content of the vegetable fibers used. The fresher or greener the fibers, and/or the higher wax, fat, gum and resin content, the stronger the sodium hydroxide solution must be in order to accomplish neutralization and/or saponification of the detrimental soluble organic components contained in these materials.

When immersed in the sodium hydroxide solution, the fibers are brought to boiling point by direct steaming and are kept at boiling temperature from 10 to 30 minutes, depending again on the freshness and wax content of the fibers under treatment. After the steaming and boiling, a foam formed from the saponified waxes, resins and fats contained in the fibers is floated off the top of the treatment tank prior to draining the sodium hydroxide solution therefrom.

The fibers are then rinsed with fresh cold or warm water and upon being removed from the treatment tank, are passed through a roller press which removes excess water, prior to being dried by either warm steam-heated air or by any other utilizable method (sun decks, etc.), to about 10% moisture content. The dried fibers, if required, are then classified through a two-stage vibro-screen, into coarse, medium and fine fibers prior to being conveyed into their separate storage bins.

Some fibers, by the nature of their size and form, such as pineapple leaf fibers, hemp and cocoanut fibers, do not require screening, but must be split and separated in special beater drums before being conveyed to their respective storage bins.

The waste caustic (sodium hydroxide) solution, after being drained from the fiber neutralizing treatment tank, contains many valuable organic chemicals, and some of these, if desired, can be economically recovered as commercial by-products.

THE BATCHING PROCEDURE

The pretreated, neutralized and dried cellulosic fibers are then mixed in varying cementitious formulations, depending for what purpose or use the manufactured products are intended.

Several cementitious binders can be used, such as lime and plaster of Paris, magnesia or other oxychloride cements, standard Portland and white Portland cements, etc., with or without standard aerating, activating, accelerating, stabilizing and waterproofing chemical additives or admixtures.

The actual mixing or batching procedure also varies from what might be conventionally expected in that the pretreated and dried cellulosic fibers constitute the last ingredient added to the specially prepared formulation before casting into forms or molds.

As an illustration, a basic formulation of standard Portland cement binder and the order of the batching sequence are set forth in the following examples.

Example I

TABLE 1.—STARTING MATERIALS

| | Parts by Weight | Measured Portions |
|---|---|---|
| Primary Blend: | | |
| Standard Portland cement | 64 | 4 lbs. |
| Calcite or calcium carbonate (pulverized, passing 200 mesh). | 8 | ½ lb. (by weight). |
| Oxide color (if desired) | 1 | 1 oz. (dry measure). |
| First Solution: | | |
| Calcium chloride | 2 | 2 oz. (by weight, dry measure). |
| Water | About 35.2 | 1,000 cc. |
| Second Solution: | | |
| Sodium silicate | About 1 to 1.32 | 25 cc. |
| Water | Abour 12.32 | 350 cc. |
| Final Fibrous Ingredient: Sugar cane bagasse (pretreated, neutralized and dried). | 12 | 12 oz. |

The mixing order and the batching sequence of the above formulation is at follows:

(1) The dry powders of the primary blend are thoroughly mixed in a paddle type mortar or cement mixer until uniformly dispersed.

(2) The first solution, after being separately prepared, is added to the dry mixed powders prepared in step (1) above and thoroughly mixed to proper consistency.

(3) The second solution, after being separately prepared, is added to the above thoroughly mixed product of step (2) and the whole is again mixed to uniform dispersion and consistency.

(4) The pretreated, neutralized and dried cellulosic fiber material is then added to the cementitious slurry of steps (1), (2) and (3) above and the whole is thoroughly mixed for about five to ten minutes. During this time, the dry cellulosic fibers absorb most of the cementitious slurry to the complete saturation of the fiber material.

The formula given in Table I produces a set and hardening product, weighing about six pounds, four ounces per board foot or about 75 lbs. per cubic foot.

Example II

The procedure of Example I above was repeated but this time using ten ounces of pineapple leaf fibers in place of the twelve ounces of bagasse fibers. The product had a density of about 74 lbs./cu. ft.

Example III

The procedure of Example I was again repeated but this time using ten ounces of cocoanut fibers. The product had a density of about 75 pounds per cubic foot.

Example IV

The procedure of Example I was repeated with the use of twelve ounces of bamboo fibers and the product again had a density of about 75 pounds per cubic foot.

Example V

In this example, ten ounces of hemp fibers were substituted for the twelve ounces of bagasse fibers used in Example I. The resultant product had a density of about 75 lbs./cu. ft.

Example VI

Twelve ounces of mixed wood shavings were substituted into the procedure of Example I for the bagasse fibers employed therein. The desirable product was again found to have a density of about 75 lbs./cu. ft.

FORMING AND MOLDING PROCEDURE

From the mixers, the lightweight concrete mass prepared according to any one of the above examples is conveyed through mechanically agitated feeder chutes to the molding forms (which, of course, are of any desired shape or size) and is spread to the required thickness by special carpeting rollers. The partially molded mixture may also be vibrated and rammed or tampered by pneumatic, hand, or mechanical tampers to a required consolidation, before being finished by special surfacing rollers to a smooth finish or to any other desired textured pattern.

CURING PROCEDURE

The lightweight concrete products, after being properly spread, tampered and surface finished, are conveyed in their molding forms through a continous steam curing tunnel, at the rate of about one foot per minute.

During the first 2 hours of travel through the tunnel, the products are slowly heated from the atmospheric or ambient temperatures to about 180° F. The next 2 hours, the products travel through a holding zone, where the temperature is maintained at a constant 180° F. For the last 2 hours, the products travel through a cooling zone, where the temperature is gradually reduced back again to that of the atmospheric or ambient temperature.

Upon leaving the steam curing tunnel, the set and hardened products in their molding forms, are mechanically removed from the tunnel conveyors and are transported by other conveyors to the racking zone, where the molding forms are removed and returned for reuse. The lightweight concrete products are then placed on special racks and conveyed to a roofed, water-spray curing shed, where they are kept for 4 days of moist curing. After moist curing, the products are exposed to 16 days of open air atmospheric curing, where they reach their matured hardness and strength. Naturally, they may also be shipped directly from moist curing to the consumer when the shipping procedure will be sufficiently gentle and of a sufficiently long time to permit further desired curing.

CHEMISTRY INVOLVED

Having disclosed the purpose and the theory of the invented process, as well as the step by step manufacturing and fabricating procedure, it is desired to explain to some extent, and as presently understood, the complex chemical reactions involved.

From the formulae given in the examples, it will be observed that certain materials and chemicals are incorporated with the standard Portland cement and that the wetting of the cement and other dry powders is performed in a two stage operation, so as to permit time for the intended chemical reactions to take place. The complex nature of the chemistry in this specially prepared cementitious formulation is not completely and fully understood. However, the necessary aqueous acid and the base solutions are purposely compounded to effect favorable acid-base reactions, with the accompanying precipitations of insoluble, crystallizable metallic salts and their compounds of complex compositions.

From the "first solution," some of the chloride is used to induce reaction with various metallic oxides contained in the cement to form oxychlorides. Some chloride also reacts with the finely pulverized calcite or calcium carbonate (whichever is used) to liberate the anhydride of carbonic acid (carbon dioxide), precipitating calcium oxide.

Part of the liberated carbonic acid anhydride reacts with the remaining metallic oxides, forming carbonates, which in turn react with the silica of the sodium silicate introduced with the "second solution" to form finely divided and dispersed, crystallizable compounds of silica, not dissimilar in chemistry to silicate glass.

The remaining sodium carbonate reacts with any remaining lime, to form sodium hydroxide and calcium carbonate. The sodium hydroxide, reacts with any calcium chloride left, precipitating finely divided sodi-calcium compounds. These reactions, in some manner not clearly understood, impart rapid setting and hardening properties to the resulting concrete mass.

The various precipitates formed in the acid-base reactions above-mentioned, and their complex compounds (in a very finely divided state, defying measurement), intermix uniformly with the cement and other materials of the formulation in its aqueous state, and upon being absorbed by the pretreated and dried cellulosic fibers to the complete saturation of the fiber cells, crystallize, set and harden within the fiber cells uniformly and simultaneously with the rest of the concrete mass.

Although the concrete thereby made has very rapid setting and hardening properties, the chemical reactions, being reversible, are not completed as rapidly as the setting, and continue for quite some time after, till the acid-base equilibrium is finally reached, usually in about 2 to 3 weeks. During this time, further crystallization and carbonation takes place, with the formation of insoluble calcium silicate and other metallic compounds, which fill the pits, voids and crevices of the hardened concrete, including, of course, any empty or partially empty fiber cells which may have failed to be completely impregnated in the prior absorption cycle.

Due probably to the high carbonate content of the thusly made concrete, eventual calcification, petrification and/or silicification of the fiber material takes place, which results in the beneficial properties of rot and decay resistance. Although the formulae given in the examples above may be sometimes modified, as in the fabrication of lighter weight, less strength requiring products, the basic chemistry remains the same. For example, the amount of Portland cement may vary from 26 to about 70 parts, calcium carbonate may vary from 6 to about 56 parts, calcium chloride from 1 to about 3 ounces or parts, sodium silicate from 5 to about 30 cc., i.e., about 0.2 to about 1.58 parts, fibers from 8 to about 16 ounces or parts, and total water may vary from about 1200 to about 2000 cc., although the amounts given in Example I above are to be preferred.

PHYSICAL PROPERTIES IN GENERAL

The manufactured products herein may vary in density, tensile strength, compressive strength, elastic modulus, weight and other properties, depending upon the purpose for which the particular products are made. On the average, the present products have the following characteristics:

(1) *Weight.*—The present structural material has a density of about 60 to 75 lbs. per cubic foot, or 5 to 6.25 lbs. per board foot (12" x 12" x 1"). The present structural material is 60 to 50% lighter than concrete which has a density of about 150 lbs. per cu. foot, or 12.5 lbs. per board foot. Finally, the present structural material is 18 to 47% heavier than unseasoned lumber at 4.5 lbs. per board ft. for timbers and hardwoods, and about 4 lbs. for pine. When in the form of acoustical and ceiling materials, the present lightweight concrete weighs from 2.4 to 36 lbs. per cubic foot.

(2) *Permeability.*—The present products in general have high water proofing qualities and when in the form of roof, floor tiles and outside wall boards exhibit especially desirable nonpermeability properties by reason of the chemical additives employed herein.

(3) *Fire resistance.*—Concrete in general is considered fire resistant. The cellulose fibers used herein being impregnated with chemical additives, are rendered fire resistant inasmuch as they do not support combustion.

(4) *Termite resistance.*—It appears from all tests and available evidence that the present materials are termite proof due to the substantially complete chemical impregnation of the fibers employed herein.

(5) *Aging.*—All concrete products become stronger with age, due to absorption of carbon dioxide from the air by the limes in the cement, with the subsequent inversion to limestone. Thus the present material has been found to become stronger with age and, as has been observed, shows very little deleterious effect from severe treatment and weathering.

(6) *Compressive and tensile strengths.*—Samples of materials made by the processes of Example I to VI have undergone several tests, performed by independent agencies, and the results are presented herewith.

All tests have been made on samples after 21 days of curing period, comprising 6 hours of wet steam curing at 180° F., for four days of water spray curing and 16 days of atmospheric open air curing. An average of 5 samples was taken for the test results in each case.

The results from these tests vary somewhat with the type of vegetable fibers used, and the table below shows the differences in strengths of the present lightweight concretes made from the different fibers:

TABLE 2.—LIGHTWEIGHT CONCRETE TEST DATA

| Example | Type of Cellulosic Fiber Employed | Density, lbs./cu. ft. | Compressive strength in p.s.i. | Tensile strength in p.s.i. |
| --- | --- | --- | --- | --- |
| I | Bagasse | 75 | 1,150 | 180 |
| II | Pine leaf fibers | 74 | 2,100 | 420 |
| III | Cocoanut | 75 | 2,000 | 350 |
| IV | Bamboo fibers | 75 | 1,800 | 380 |
| V | Hemp fibers | 74 | 2,000 | 340 |
| VI | Mixed wood shavings | 75 | 1,280 | 200 |

(7) *Thermal shock tests.*—A Hawaiian sugar manufacturing company submitted a full size irrigation gate flume manufactured from the present material to a sugar cane fire in which the flume was placed on top of the burning sugar cane. After burning for several hours, the hot flume was hosed with cold water and examined for damages. No detrimental effects have been found. This flume is now undergoing field test and after passing many million gallons of water at high velocity, no ill effects whatsoever have been noted.

In a fire test by another company, samples of the present material were subjected to the high temperature flame of an acetylene torch and sprayed immediately thereafter with cold running water. Surprisingly, no ill effects were observed. The samples were later cut to examine for internal fiber damage and none have been found. This test is significant in the fact that the use of the acetylene torch provides rather uneven heat distribution throughout the sample being tested and yet neither cracks, spalling, nor distortion have been observed. All things considered, the present material proved to be very stable to thermal shocks.

(8) *Dimensional stability.*—Samples were submitted to wet, dry, cold (freezing and below zero) and hot (oven temperature at 550° F.) cycles for prolonged periods. No distortion, shrinkage or expansion other than within normal limits for concrete products were registered.

(9) *Weatherability.*—Samples were submitted to open atmospheric conditions of sun and rain for a period of more than a year. No ill effects whatsoever have been observed.

(10) *Durability.*—Samples were submitted to the following several destructive chemical biological and physical tests, with no detrimental effects noted.

(10a) *Saline tests.*—Samples were immersed in sea water to complete saturation and after exposure to atmospheric conditions, were again immersed in sea water in repeating cycles. No ill effects were noted after 6 months of testing.

(10b) *Acid tests.*—Samples were immersed in sulfuric and muriatic acid (HCl) solutions of varying strengths ranging from 10% to full concentration. Some superficial discoloring and destruction of exposed vegetable fibers was noted at high acid concentration, and at weaker acid concentrations, no detrimental effects were shown.

(10c) *Sulfate tests.*—Magnesium and copper sulfates of various concentrations were used with no apparent ill effects.

(10d) *Absorption tests.*—Samples were dried to constant weight in an oven maintained at 225 °F. and then immersed in water to complete saturation. Some varied but harmless results have been noted, both for samples of different vegetable fibers as well as for samples of different formulations and admixtures.

(10e) *Rotting tests.*—Samples were buried in a humid mass of decaying vegetable matter for a period of 6 months. On being removed, the samples were washed and examined externally and internally for deterioration of the cellulosic fibers. No such deterioration was observed.

It is intended to utilize the present process for the manufacture of inexpensive, strong, weatherproof, termite and fire resisting, lightweight building materials and products, such as: external and internal wall boards; internal partition boards, finished on one or both sides; waterproof floor and roof tiles; corrugated sheets and panels; patio slabs and property fence tiles; acoustical tiles and other lightweight ceiling materials; decorative curves, tiles and synthesized marble plates for architectural facading and landscaping; extruded hollow blocks, drain pipes, power and communication circuit conduits; lightweight irrigation flumes, ditches and pipe lines up to 12 inches in diameter without steel reinforcing for low pressure installations; and larger diameter pipes with standard steel reinforcements. It will be obvious to those skilled in the art that many other materials and products can be easily manufactured from the concrete composition prepared by the abovementioned process due to its ready adaptability for use in extrusion, stamping, dry, medium, and wet casing. Accordingly, it is to be understood that various changes and modifications can be made in the foregoing detailed description and procedure without departing from the spirit and scope of this invention. For example, it may be found that other hydroxides, alkalis and saponifying materials may be found suitable for replacing the sodium hydroxide employed herein, which material is presently most desired because of its low cost, plentiful supply and high solubility.

What is claimed is.

1. A process for the preparation of a lightweight concrete product which comprises the steps of:

(1) neutralizing cellulosic fibrous materials by contacting them with an aqueous sodium hydroxide solution at an elevated temperature to extract unstable and soluble substances which would interfere with the setting of hydraulic cement mixed therewith in the presence of water, washing the fibrous materials to remove the neutralizing solution, and drying the fibrous materials to remove moisture and provide neutralized and dried fibers consisting essentially of true and stable cellulose;

(2) mixing together about 26 to about 70 parts by weight of Portland cement with about 6 to about 56 parts by weight of calcium carbonate, mixing therewith an aqueous solution containing about 1 to about 3 parts by weight of calcium chloride, then mixing therewith an aqueous solution containing from about 0.2 to about 1.58 parts by weight of sodium silicate to provide a hydraulic cement slurry having sufficient water from said aqueous solutions for proper consistency and curing;

(3) mixing about 8 to about 16 parts by weight of the neutralized and dried cellulosic fibers with the hydraulic cement slurry to coat and completely impregnate the cellulosic fibers and provide a thick molding paste; and then molding and curing said molding paste to provide a lightweight concrete product.

2. The process of claim 1 wherein the fibers, after drying, contain about 5 to about 20% moisture by weight.

3. The process of claim 1 wherein the fibers, after drying, contain about 10 to about 15% moisture by weight.

4. The process of claim 1 wherein the lightweight concrete product is cured with steam, followed by spraying with water.

5. A lightweight concrete having the following approximate composition:

| | Parts by weight |
|---|---|
| Portland cement | 64 |
| Calcium carbonate | 8 |
| Calcium chloride | 2 |
| Sodium silicate | About 1 |
| Cellulosic fibrous material | 12 |
| Water to provide fluidity. | | wherein the fibrous material is prepared by treatment with an aqueous sodium hydroxide solution at elevated temperature to neutralize the fibrous material and remove unstable and soluble substances which would interfere with the setting of the composition, followed by washing and drying to provide fibrous material consisting essentially of true and stable cellulose.

6. A lightweight concrete having a density within the range of about 60 to 75 pounds per cubic foot and comprising 10 to 12 parts by weight of neutralized and substantially dried cellulosic fibrous materials essentially consisting of true and stable cellulose, wherein the cellulosic fibrous material is prepared by treatment with an aqueous sodium hydroxide solution at elevated temperature to neutralize the fibrous material and remove unstable and soluble substances which would interfere with the setting of the lightweight concrete, followed by washing and drying to provide fibrous material consisting essentially of true and stable cellulose; about 64 parts of Portland cement, about 8 parts of calcium carbonate, about 2 parts of calcium chloride, about one part of sodium silicate; said lightweight concrete being prepared by mixing together said Portland cement with said calcium carbonate, then mixing therewith an aqueous solution containing said calcium chloride, then mixing therewith an aqueous solution containing said sodium silicate, and then mixing said neutralized and dried fibrous material therewith to coat and completely impregnate said fibrous materials; said aqueous solutions having sufficient water within the range of about 45 to 50 parts to provide for proper consistency and curing.

7. The concrete of claim 6 wherein the cellulosic fibers are obtained from cocoanut trees.

8. The concrete of claim 6 wherein the cellulosic fibers are obtained from pineapple plants.

9. The concrete of claim 6 wherein the cellulosic fibers are obtained from sugar cane.

10. The concrete of claim 6 wherein the cellulosic fibers are obtained from bamboo plants.

11. The concrete of claim 6 wherein the cellulosic fibers are obtained from banana plants.

12. The concrete of claim 6 wherein the cellulosic fibers are obtained from hemp.

13. The concrete of claim 6 wherein the cellulosic fibers are obtained from wood shavings.

14. A process for the manufacture of lightweight concrete products which comprises the steps of (1) contacting cellulosic fibrous materials with an aqueous sodium hydroxide solution and mechanically agitating said cellulosic fibrous materials in the presence of said aqueous sodium hydroxide solution at elevated temperature to remove unstable and soluble substances which would affect the setting of hydraulic cement mixed therewith in the presence of water, thereby providing essentially true and stable cellulose, washing said fibrous materials with a further aqueous solution, drying the fibrous material to remove moisture; (2) mixing about 64 parts by weight of Portland cement with about 8 parts by weight of calcium carbonate, mixing therewith about 2 parts by weight of calcium chloride in aqueous solution, then mixing therewith about one part by weight of sodium silicate in aqueous solution to provide a hydraulic cement slurry, said aqueous solutions having sufficient water to provide for proper consistency and curing, and then (3) mixing said slurry with about 10 to 12 parts by weight of said dried fibrous material to coat and completely impregnate the fibrous material and provide a thick molding composition, followed by molding and curing said composition to provide a lightweight concrete product.

15. A lightweight concrete having the following approximate composition:

| | |
|---|---|
| Portland cement | About 26 to about 70 parts. |
| Calcium carbonate | About 6 to about 56 parts. |
| Calcium chloride | About 1 to about 3 parts. |
| Sodium silicate | About 0.2 to about 1.58 parts. |
| Neutralized and dried cellulosic fibrous material | About 8 to about 16 parts. | wherein the fibrous material is prepared by treatment with an aqueous sodium hydroxide solution at elevated temperature to neutralize the fibrous material and remove unstable and soluble substances which would interfere with the setting of the composition, followed by washing and drying to provide fibrous material consisting essentially of true and stable cellulose.

References Cited by the Examiner

UNITED STATES PATENTS

| 287,994 | 11/1883 | Armstrong | 106—93 |
| 1,309,296 | 7/1919 | Marks | 106—93 |
| 2,175,568 | 10/1939 | Haustein | 106—93 |
| 2,504,579 | 4/1950 | Perl | 106—93 |
| 2,794,738 | 6/1957 | Spencer et al. | 162—90 |
| 2,820,713 | 1/1958 | Wagner | 106—93 |
| 2,899,350 | 8/1959 | Birdseye | 162—90 |
| 3,036,949 | 5/1962 | Cha | 162—90 |
| 3,062,669 | 11/1962 | Dilnot | 106—93 |

FOREIGN PATENTS

| 253,007 | 6/1926 | Great Britain. |
| 662,670 | 12/1951 | Great Britain. |

TOBIAS E. LEVOW, *Primary Examiner.*

S. E. MOTT, *Assistant Examiner.*